US008083340B2

(12) United States Patent
Oyanagi et al.

(10) Patent No.: US 8,083,340 B2
(45) Date of Patent: Dec. 27, 2011

(54) CONTAINER AND METHOD FOR STORING LIGHT-CURABLE INK

(75) Inventors: Takashi Oyanagi, Shiojiri (JP); Keitaro Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 638 days.

(21) Appl. No.: 11/723,565

(22) Filed: Mar. 20, 2007

(65) Prior Publication Data

US 2007/0229612 A1 Oct. 4, 2007

(30) Foreign Application Priority Data

Mar. 20, 2006 (JP) ................................ 2006-077771
Feb. 7, 2007 (JP) ................................ 2007-028336

(51) Int. Cl.
*C09D 11/00* (2006.01)

(52) U.S. Cl. .................................... 347/100; 106/31.13

(58) Field of Classification Search .................... 347/85, 347/86, 100; 106/31.13
See application file for complete search history.

(56) References Cited

U.S. PATENT DOCUMENTS 5,623,001 A 4/1997 Figov
6,114,411 A 9/2000 Nakamura et al.
6,315,402 B1 * 11/2001 Kawase .......................... 347/85
6,531,521 B2 3/2003 Baba et al.
2002/0041313 A1 * 4/2002 Koitabashi et al. ............. 347/86
2002/0130940 A1 * 9/2002 Suzuki et al. ................. 347/102
2004/0119797 A1 * 6/2004 Yoshizawa et al. ............. 347/85
2006/0050116 A1 3/2006 Nakajima
2008/0225063 A1 * 9/2008 Cohen et al. ...................... 347/1

FOREIGN PATENT DOCUMENTS

GB 2412088 A * 9/2005
JP 01-180351 A 7/1989
JP 02-221508 A 9/1990
JP 06-099588 A 4/1994
JP 073034187 A 11/1995
JP 09-165541 6/1997
JP 09176533 A 7/1997
JP 200162819 A 6/2001
JP 2001514985 A 9/2001
JP 2001305733 11/2001
JP 2001322290 A 11/2001
JP 2004-196936 7/2004
JP 2004321898 A 11/2004
JP 2005080649 A 3/2005
JP 2005212336 A 8/2005
WO WO 99/08876 A 2/1999

* cited by examiner

*Primary Examiner* — Laura Martin

(74) *Attorney, Agent, or Firm* — Nutter McClennen & Fish LLP; John J. Penny, Jr.; Christopher J. Stow

(57) ABSTRACT

There is provided a method of storing a light-curable ink composition. Air and the light-curable ink composition are introduced into a container. The distance from an air-liquid interface to a bottom portion of the container is equal to or less than 5 cm. The amount of oxygen dissolved in the light-curable ink composition is maintained so as to be equal to or more than 3 ppm.

18 Claims, 2 Drawing Sheets

CONTAINER AND METHOD FOR STORING LIGHT-CURABLE INK

BACKGROUND

1. Technical Field

The present invention relates to an ink container and a method of storing the ink, and more particularly, to an ink container and a method of storing the ink, capable of storing ink composition with excellent stability.

2. Related Art

An ink-jet recording method is a method of printing by ejecting small droplets of ink composition onto and attaching the small droplets to a recording medium. The ink-jet recording method is characterized in that an image having a high resolution and being of high quality can be printed at a high speed. An ink composition for use in the ink-jet recording method includes an aqueous solvent as a main component, a coloring component and a wetting agent such as glycerin for preventing clogging.

When a printing process is performed on a recording medium such as paper or a clothing material into which an aqueous ink composition has difficulty permeating or a recording medium such as a substrate or a film manufactured from metal, plastic and the like into which the aqueous ink composition can not permeate such as resins i.e., phenol, melamine, vinyl chloride, acryl and polycarbonate. The ink composition is required to have a component capable of stably attaching a coloring material to the recording medium.

In response to the above-mentioned requirement, a light-curable ink-jet ink including a coloring material, a light-curing agent (a radically polymerigable compound), a (photo-radical) polymerization initiator and the like has been disclosed (see U.S. Pat. No. 5,623,001). By using the ink composition in U.S. Pat. No. 5,623,301, it is possible to prevent spreading of the ink to the recording medium and improve image quality.

When an ink composition is to be cured by photo-radical polymerization, there is a possibility that a polymerization reaction (dark polymerization) may be caused by a thermal radical or the like and viscosity thereof could be thereby increased during storage. In order to solve the above-mentioned problems, JP-A-2004-196936 discloses a technology in which the concentration of dissolved oxygen is controlled to be within a predetermined range, and dark polymerization is prevented by inhibiting polymerization with oxygen.

However, in the technology disclosed in JP-A-2004-196936, the concentration of the dissolved oxygen is specified only at a specific temperature, and there were cases where a satisfactory effect was not obtained when ink was stored for a long period of time during which environmental temperature greatly varied.

SUMMARY

An advantage of some aspects of the invention is that it provides an ink container and a method of storing the ink, capable of preventing dark polymerization effectively even when the ink composition is stored for a long period of time during which environmental temperature greatly varies, thereby storing light-curable ink composition with excellent stability.

As a result of repeated studies, the inventors of the invention have found that the above-mentioned advantage can be accomplished by employing the following arrangements.

[1] According to an aspect of the invention, there is provided a method of storing a light-curable ink composition, wherein air and the light-curable ink composition are introduced into a container, changed the distance from an air-liquid interface to a bottom portion of the container is equal to or less than 5 cm, and the amount of oxygen dissolved in the light-curable ink composition is maintained so as to be equal to or more than 3 ppm.

[2] In the method of storing a light-curable ink composition according to the invention, it is desirable that the amount of nitrogen dissolved in the light-curable ink composition is maintained to be equal to or more than 3 ppm.

[3] In the method of storing a light-curable ink composition according to the invention, it is desirable that the distance from the air-liquid interface to the bottom portion of the container is equal to or less than 4 cm.

[4] In the method of storing a light-curable ink composition according to the invention, it is desirable that the distance from the air-liquid interface to the bottom portion of the container is in the range of 1 to 4 cm.

[5] In the method of storing a light-curable ink composition according to the invention, it is desirable that the amount of air introduced into the container is equal to or more than 30 ml.

[6] In the method of storing a light-curable ink composition according to the invention, it is desirable that the amount of air introduced into the container is in the range of 30 to 50 ml.

[7] In the method of storing a light-curable ink composition according to the invention, it is desirable that the container is an airtight container.

[8] According to an aspect of the invention, there is provided an ink container in which air and a light-curable ink composition are introduced thereinto, wherein the distance from an air-liquid interface to a bottom portion of the storage container is equal to or less than 5 cm, and wherein the light-curable ink composition is stored in a state where the amount of oxygen dissolved in the light-curable ink composition is maintained so as to be equal to or more than 3 ppm.

[9] In the ink container according to the invention, it is desirable that the light-curable ink composition is stored in a state where the amount of nitrogen dissolved in the light-curable ink composition is maintained so as to be equal to or more than 3 ppm.

[10] In the ink container according to the invention, it is desirable that the light-curable ink composition is stored in a state where the distance from the air-liquid interface to the bottom portion of the storage container is maintained so as to be equal to or less than 4 cm.

[11] In the ink container according to the invention, it is desirable that the light-curable ink composition is stored in a state where the distance from the air-liquid interface to the bottom portion of the storage container is in the range of 1 to 4 cm.

[12] In the ink container according to the invention, it is desirable that the amount of air introduced into the storage container is equal to or more than 30 ml.

[13] In the ink container according to the invention, it is desirable that the amount of air introduced into the storage container is in the range of 30 to 50 ml.

[14] In the ink container according to the invention, it is desirable that the storage container is an airtight container.

In the invention, "the distance from the air-liquid interface to the bottom portion of the container" refers to an average value of the distance from the air-liquid interface to the bottom portion of the container in a state where the ink is stored. In addition, the conditions described in Claims of the invention need to be satisfied only when the ink container according to an embodiment of the invention or the ink container preserved by the method according to an embodiment of the invention is mounted on a printing apparatus.

When a polymerization reaction (dark polymerization) is caused in the light-curable ink composition by a thermal radical or the like and the polymerization reaction is started once, polymerization chain reaction may not be stopped and viscosity of the light-curable ink composition may be increased. However, since the amount of dissolved oxygen serving as a polymerization inhibitor in the container is equal to or more than 3 ppm in the ink container and the method of storing the ink composition according to the embodiment of the invention, it is possible to prevent the dark polymerization during the long-time storage effectively and quality deterioration.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Hereinafter, an ink container and a method of storing a light-curable ink composition will be described in detail. In the invention, "the distance from an air-liquid interface to a bottom portion of the container" refers to an average value of the distance from the air-liquid interface to the bottom portion of the ink container in a state where the ink is being stored. In addition, the conditions described in Claims of the invention need to be satisfied only when the ink container according to an embodiment of the invention or the ink container storing ink by the method according to an embodiment of the invention is mounted on a printing apparatus.

The container to be used as the ink container according to an embodiment of the invention is not particularly limited as long as the amount of oxygen dissolved in the light-curable ink composition in the container is maintained so as to be equal to or more than 3 ppm. However, it is desirable that the container is configured with a plastic case or a pouch-like container (a so-called ink pack) that is prepared by bonding aluminum-evaporated multi-layered films together.

Figure 1:
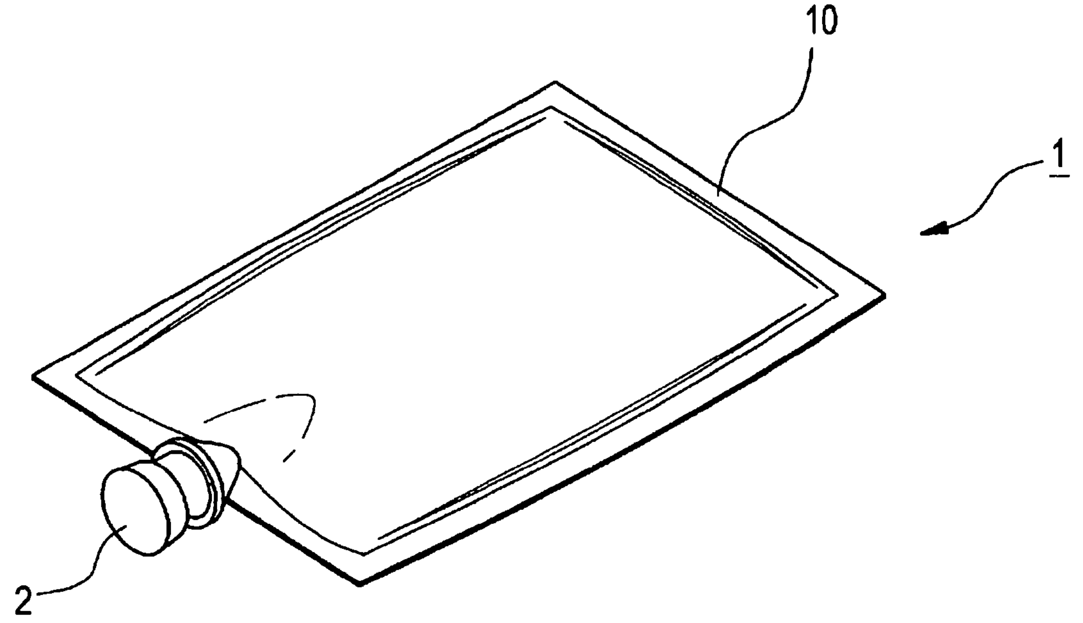
FIG. 1 is a diagram showing an external appearance of an example of an ink container according to an embodiment of the invention.

The ink container according to the embodiment of the invention is illustrated in FIG. 1. In FIG. 1, an ink container 1 has a multilayered structure including two sheets of polypropylene film with a rectangular shape and an aluminum layer formed by evaporation laminated thereon. The two sheets of polypropylene film and the aluminum layer formed by evaporation are bonded at a heat seal portion 10 by performing thermal sealing, thus forming a pouch-like container. The ink container 1 includes an ink outlet 2.

In the ink container according to the embodiment of the invention, the amount of oxygen dissolved in the light-curable ink composition of the container is maintained so as to be equal to or more than 3 ppm.

In the ink container according to the embodiment of the invention, it is preferable that an amount of nitrogen dissolved in the light-curable ink composition of the container is also maintained so as to be equal to or more than 3 ppm as in the case of the amount of oxygen dissolved in the light-curable ink composition of the container. When pure oxygen is introduced into the container, a safety problem may be caused. Since a nitrogen gas is an inert gas, it is preferable that air including nitrogen gas is introduced into the container.

In the ink container according to the embodiment of the invention, the upper limit of the amount of oxygen or nitrogen dissolved in the light-curable ink composition of the container is determined when these components become saturated in the light-curable ink composition under given conditions of the container such as internal pressure and temperature.

Figure 3:
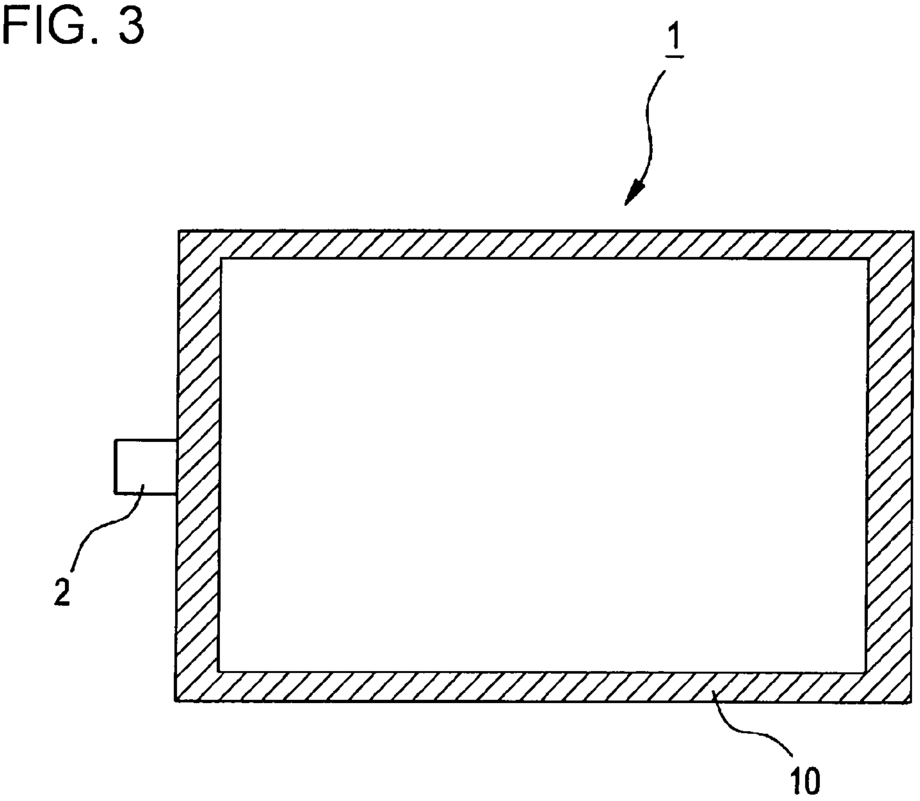
FIG. 3 is a cross-sectional view of exemplary ink containers 1 to 5 related to Examples of the invention.
Figure 4:
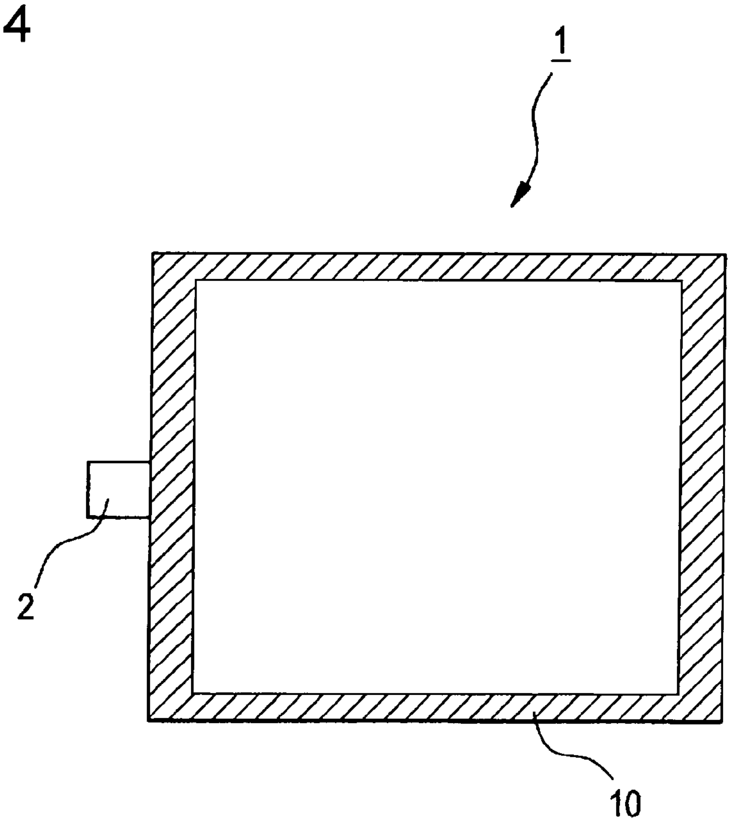
FIG. 4 is a cross-sectional view of another example of the ink containers related to Examples of the invention.

In addition, a method of maintaining the respective amounts of oxygen and nitrogen dissolved in the ink composition of the container so as to be equal to or more than 3 ppm is not particularly limited, but may include a method in which an airtight container is used as the container, a de-airing process is not performed at the time of introducing the ink composition into the ink container (in this case, the term "at the time of" may be interpreted as including the meanings of before, during, and after), and the container is sealed after being filled with the ink composition. Moreover, it is preferable that the ink composition and the air are simultaneously introduced into the container to co-exist together. When introducing the air into the container it is preferable that the amount of air introduced into a container shown in FIG. 4 is equal to or more than 30 ml, and it is preferable that the amount of air introduced into a container having the same size as that illustrated in FIG. 3 is equal to or more than 50 ml. However, considering that it is only necessary to maintain the amount of dissolved oxygen and the amount of dissolved nitrogen so as to be equal to or more than 3 ppm, it is obvious that a preferable amount of the air introduced into the container may be set in the range of 30 to 50 ml the ink container and the method of storing the light-curable ink composition according to the embodiment of the invention. Accordingly, it is possible to set the amount of air introduced into the container so as to be in the range of 30 to 50 ml appropriately, depending on a container size.

When a known ink-jet ink is introduced into the container to form an ink container (for example, an ink cartridge), the de-airing process is generally performed to remove a dissolved gas component from the ink. In the ink container and the method of storing the ink composition according to the embodiment of the invention, it is preferable to eliminate the need for the de-airing process.

Figure 2:
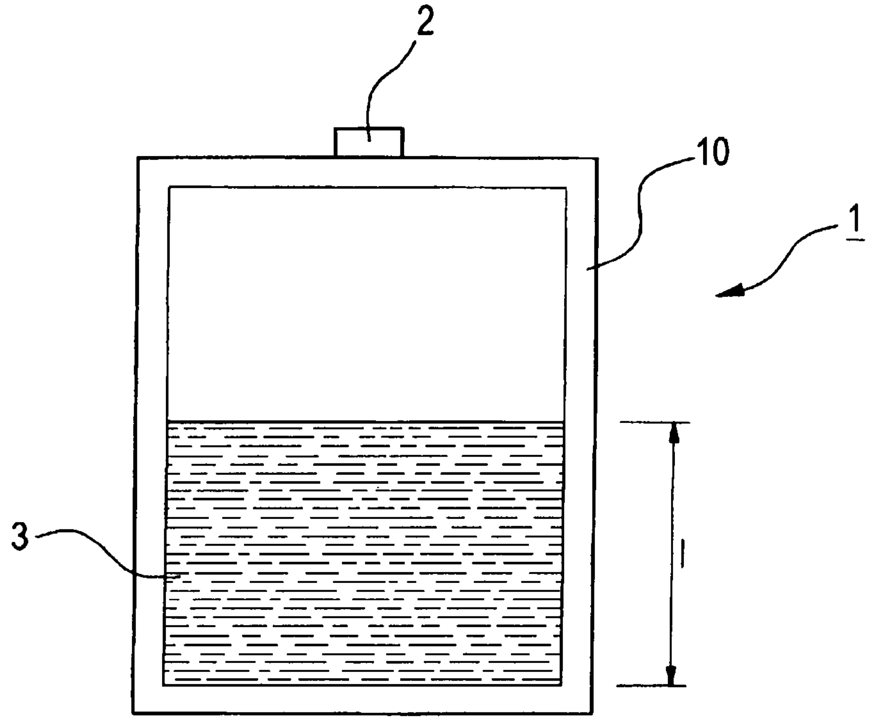
FIG. 2 is a diagram for explaining the distance from an air-liquid interface to a bottom portion of an ink composition contained in the ink container according to the embodiment of the invention.

In the ink container and the method of storing the light-curable ink composition according to the embodiment of the invention, it is preferable that a distance 1 from an air-liquid interface to a bottom portion of the ink container containing an ink composition 3 is equal to or more than 5 cm at the time of storing the ink, as schematically shown in FIG. 2. Particularly, it is preferable that the distance 1 from the air-liquid interface to the bottom portion of the ink container including the ink composition 3 is equal to or more than 4 cm. In addition, it is preferable that the distance 1 from the air-liquid interface to the bottom portion of the ink container including the ink composition 3 is in the range of 1 to 4 cm.

In this manner, by shortening the distance from the bottom portion of the container to the air-liquid interface, it is possible to allow a sufficient amount of oxygen to permeate and diffuse through the interface and maintain the viscosity of the light-curable ink composition at a level where gelling does not occur.

The light-curable ink composition for use with the ink container according to the embodiment of the invention includes at least a polymerizable compound and a polymerization initiator.

As examples of known polymerizable compounds, monofunctional monomers can be exemplified by phenoxyethyl acrylate, isobornyl acrylate, methoxydiethylene glycol monoacrylate, acroylmorpholine, lauryl methacrylate, 2-hydroxyethyl methacrylate, cyclohexyl methacrylate, oxetane methacrylate, N-vinylformamide, ethylene glycol monoallylehter, N-vinylcarbazole, N-vinylacetamide, N-vinylpyrrolidone, N-vinylcaprolactam or the like.

Bifunctional monomers can be exemplified by ethylene glycol dimethacrylate, diethylene glycol diacrylate, diethylene glycol dimethacrylate, tripropylene glycol diacrylate, 1,9-nonanediol diacrylate, polyethylene glycol (400) diacrylate, tetraethylene, glycol dimethacrylate, 1,6-hexanediol diacrylate, 1,6-hexanediol dimethacrylate, neopentyl glycol diacrylate, neopentyl glycol dimethacrylate, 2-hydroxy-1,3-dimethacryloxypropane, hydroxypiperinate ester neopentyl glycol diacrylate, 1,4-butanediol dimethacrylate or the like.

Polyfunctional monomers can be exemplified by trimethylolpropane triacrylate, trimethylolpropane trimethacrylate, trimethylolpropane EO adduct triacrylate, trimethylolpropane PO adduct triacrylate, glycerine EO adduct triacrylate, glycerine PO adduct triacrylate, pentaerythritol triacrylate, dipentaerythritol hexaacrylate, dipentaerythritol polyacrylate, dendrimer produced through a reaction between polyfunctional monomers or the like.

The photopolymerization initiator contained in the ink composition according to the embodiment of the invention may initiate polymerization of polymerigable compounds by absorbing UV light in the range of 200 to 450 nm or visible light and generating radicals or ions.

As the photopolymerization initiator used in the ink composition according to the embodiment of the invention, an example of known radical generators can be exemplified by benzoin methyl ether, benzoin ethyl ether, isopropyl benzoin ether, isobutyl benzoin ether, 1-phenyl-1, 2-propanedione-2-(o-ethoxycarbonyl) oxime, benzyl, diethoxy acetophenone, benzophenone, chloro thioxanthone, 2-chloro thioxanthone, isopropyl thioxanthone, 2-methyl thioxanthone, polychlorinated polyphenyl, hexachlorobenzene or the like, preferably isobutyl benzoin ether, 1-phenyl-1, 2-propanedione-2-(o-ethoxycarbonyl) oxime or the like.

In addition, it is possible to use commercially available photopolymerization initiators available under product names of Vicure 10 and 30 (produced by Stauffer Chemical), Irgacure 184, 127, 500, 651, 2959, 907, 369, 379, 754, 1700, 1800, 1850, 1870, 819, OXE01, Darocur1173, TPO and ITX (produced by Ciba Specialty Chemicals K.K.), Quantacure CTX and ITX (produced by Aceto Chemical), Kayacure DETX-S (produced by Nippon Kayaku Co., Ltd.), ESACURE KIP 150 (produced by Lamberti), Lucirin TPO (produced by BASF) or the like.

The light-curable ink composition of the ink container according to the embodiment of the invention may contain a polymerization promoter. Examples of the polymerization promoter can include a polymerization promoter having an amine compound. The amine compound is not particularly limited, but it is preferable to use aminobenzoate derivatives in view of their odor-reducing characteristics and their good capability for curing ink composition. This is because the aminobenzoate derivatives reduce polymerization inhibition of the oxygen.

It is preferable that the aminobenzoate derivative does not perform an absorption in a wavelength range that is equal to or more than 350 nm. Examples of the aminobenzoate derivative are not particularly limited, but can include ethyl-4-dimethylaminobenzoate and 2-ethylhexyl-4-dimethylaminobenzoate, and the examples are commercially available under product names of Darocur EDB and EHA (produced by Ciba Specialty Chemicals K.K.).

A coloring component may be contained in the light-curable ink composition used in the ink container according to the embodiment of the invention. It is preferable that the coloring component uses a pigment from a viewpoint of light resistance. Both of an inorganic pigment and an organic pigment can be used as the pigment.

Examples of the inorganic pigment can include carbon blacks (C.I. Pigment Black 7) such as furnace black, lamp black, acethylene black and channel black, iron oxide and titanic oxide.

Examples of the organic pigment can include azo pigments such as an insoluble azo pigment, a condensed azo pigment, an azo lake pigment, and a chelate azo pigment, polycyclic pigments such as a phthalocyanine pigment, a perylene pigment, a perynone pigment, an anthraquinone pigment, a quinacridone pigment, a dioxane pigment, a thioindigo pigment, an isoindolinone pigment and a quinophthalone pigment, dye chelate (for example, basic dye chelate and acid dye chelate), dye lake (basic dye lake, acid dye lake or the like), a nitro pigment, a nitroso pigment, aniline black and a daylight fluorescent pigment. The pigments can be used alone or in combination of two or more thereof. Even when the organic pigment is not described in a color index, the organic pigment insoluble in ink composition can be used.

As a black pigment, it is preferable to use carbon black. Specific examples of carbon black can include #2300, #900, HCF88, #33, #40, #45, #52, MA7, MA8, MA100 and #2200B or the like produced by Mitsubishi Chemical Corporation, Raven 5750, Raven 5250, Raven 5000, Raven 3500, Raven 1255, Raven 700 or the like produced by Columbia, Regal 400R, Regal 330R, Regal 660R, Mogul L, Mogul 700, Monarch 800, Monarch 880, Monarch 900, Monarch 1000, Monarch 1100, Monarch 1300, Monarch 1400 or the like produced by Cabot Corporation, and Color Black FW1, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 or the like produced by Degussa. The carbon blacks may be used alone or in combination of two thereof.

Yellow pigments can be exemplified by C.I. Pigment Yellow 1, 2, 3, 12, 13, 14, 16, 17, 73, 74, 75, 83, 93, 95, 97, 98, 109, 110, 114, 120, 128, 129, 138, 150, 151, 154, 155, 180, 185 or the like, preferably one or a mixture of two or more selected from a group of C.I. Pigment Yellow 74, 109, 110, 128 and 138.

Magenta and light magenta pigments can be exemplified by C.I. Pigment Red, 5, 7, 12, 48 (Ca), 48 (Mn), 57 (Ca), 15:1, 112, 122, 123, 168, 184, 202 and 209, C.I. Pigment Violet 19 or the like, preferably one or a mixture of two or more selected from a group of C.I. Pigment Red 122, 202 and 209 and C.I. Pigment Violet 19.

Cyanogen and light cyanogens pigments can be exemplified by C.I. Pigment Blue 1, 2, 3, 15:3, 15:4, 15:34, 16, 22 and 60 and C.I. Vat Blue 4 and 60 or the like, preferably one or a mixture of two or more selected from a group of C.I. Pigment Blue 15:3, 15:4 and 60.

The pigments used in white ink composition can be exemplified by titanium dioxide, calcium carbonate, calcium sulfate, zinc oxide, barium sulfate, barium carbonate, silica, alumina, kaolin, clay, talc, white clay, aluminum hydroxide, magnesium carbonate, white hollow resin emulsion or the like, preferably one or a mixture of two or more selected from the above group of examples.

In addition, the pigments of the colors can be mixed with one another to adjust color tones thereof. For example, it is possible to mix a pigment black 7 and a pigment blue 15:3 for the purpose of changing a color tone of reddish black into a bluish one.

It is preferable that the pigments used in the embodiment of the invention have an average particle diameter in the range of 10 to 500 nm, more preferably in the range of 50 to 300 nm. A mixing amount of the pigments used in the embodiment of the invention may be properly determined in accordance with the composition of the ink such as a high/low density ink composition, but may be determined in the range of 1.5 to 20% by weight in the ink composition, preferably in the range of 3 to 10% by weight in the ink composition.

The ink composition according to the embodiment of the invention may include an aqueous solvent. As optional components, a resin emulsion, an inorganic oxide colloid, a wetting agent, a pH adjuster, a preservative, a fungicide, a thermal polymerization inhibitor, a surfactant or the like may be added.

The ink composition according to the embodiment of the invention is applied or discharged from an ink-jet recording head onto a substrate, a recording medium or the like, and UV light is irradiated subsequently thereon.

An irradiation amount of the UV light is changed in accordance with a thickness and the amount of ink composition deposited on the substrate, the recording medium or the like. The irradiation amount of the UV light cannot be specified strictly, but preferable conditions are to be selected. For example, the UV light is irradiated in an amount in the range of 10 to 10,000 $mJ/cm^2$, preferably in the range of from 50 to 6,000 $mJ/cm^2$. Under a condition in which the irradiation amount of the UV light is set in the desirable range, it is possible to generate a curing reaction.

A lamp for irradiating the UV light can be exemplified by a metal halide lamp, a xenon lamp, a carbon-arc lamp, a chemical lamp, a low-pressure mercury vapor lamp, a high-pressure mercury vapor-lamp or the like. For example, it is possible to irradiate the UV light by using lamps available on the market such as an H lamp, a D lamp and a V lamp manufactured by Fusion System.

From an aspect of reducing energy consumption, it is particularly preferable that the UV light is irradiated by a UV light-emitting semiconductor element such as a UV light-emitting diode (a UV LED) or a UV light-emitting semiconductor laser.

In a recording method using the ink composition according to the embodiment of the invention, it is possible to perform a heating process before irradiating the UV light, at the same time as an irradiation process of the UV light, or after irradiating the UV light. Examples of the heating process can include a method of heating by contacting the recording medium with a heat source or a method of heating without contacting the recording medium such as the irradiating of infrared light or microwaves (electromagnetic waves having a maximum wavelength of about 2,450 MHz) or the applying of heated air.

EXAMPLES

Hereinafter, the invention will be described in detail with reference to examples and comparative examples. However, the invention is not limited to the examples.

Preparation of Ink Composition 1

In a light-shielding sample bottle with a capacity of 110 ml, N-Vinyl formamide (NVF, produced by Arakawa Chemical Industries, Ltd., beam set 770) and tripropylene glycol diacrylate (TPGDA, produced by SHIN-NAKAMURA CHEMICAL CO., LTD, APG-200) as monomers, Irgacure 819 (produced by Ciba Specialty Chemicals K.K.), Irgacure 369 (produced by Ciba Specialty Chemicals K.K.), Irgacure ITX (produced by Ciba Specialty Chemicals K.K.) and Darocur EHA (produced by Ciba Specialty Chemicals K.K.) as photopolymerization initiators or polymerization promoters, and BYK-UV 3570 of 0.2 g (produced by BYK Chemical Japan) as a surfactant were mixed, and stirred by a magnetic stirrer for one hour, thus preparing an ink composition 1.

At this time, ink composition viscosity thereof was measured by using MCR-300 produced by Physica (hereinafter, the same instrument was used to measure viscosity), and the ink composition viscosity was 14.8 (mPa·s).

NVF: 22% by weight
APG-200: 71% by weight
Irgacure 819: 4% by weight
Irgacure 369: 1% by weight
Irgacure ITX: 1% by weight
Darocur EHA: 1% by weight
BYK-UV 3570: 0.2% by weight Storage Stability Test 1

The ink composition 1 was introduced into a storage container shown in FIG. 3, and a heat-sealing process was performed to seal the storage container under the conditions shown in Table 1. The storage containers used in the examples were ink containers (a structure in which polypropylene—aluminum evaporation multilayered films are bonded, manufactured by Seiko Epson Corporation). The capacity of the storage container of FIG. 3 was 110 ml, and the size of the container was 131 mm×90 mm in a cross-sectional view of FIG. 3.

An ink container 1 was prepared by performing the heat-sealing process at a portion closer to a liquid side than an air-liquid interface to seal the storage container (the size of the interior of ink container excluding the heat-sealed portion was 117 mm×80 mm) without performing a de-airing process and injecting 50 ml of air from an ink outlet 2. An ink container 2 was prepared by the same method as the ink container 1, but air was not injected into the ink container 2. It was confirmed that the amounts of oxygen and the amounts of nitrogen dissolved in the ink composition of the ink container 1 and the ink container 2 were equal to or more than 3 ppm by using a gas chromatography method.

The de-airing process is an operation in which a depressurizing process is performed in a vacuum chamber and gases dissolved in the ink composition are removed. In the vacuum chamber, a storage container filled with 50 g of the ink composition was installed. The depressurizing process was performed to make the pressure in the vacuum chamber equal to or less than 10 (hPa) and the depressurization state was maintained in the vacuum chamber for 10 minutes so that the dissolved gases of the ink composition were removed. Subsequently, a nitrogen substitution operation was performed on the vacuum chamber to return the vacuum chamber to a normal pressure state, and the heat-sealing process was performed to seal the storage container at the portion closer to the liquid side than the air-liquid interface so as not to incorporate gases in the storage container just after the time when the nitrogen substitution operation was performed, thus preparing an ink container 3. It was confirmed that the amount of oxygen and the amount of nitrogen dissolved in the ink composition of the ink container 3 were equal to or more than 1 ppm by using the gas chromatography method.

An ink container 4 was prepared by performing the de-airing process and injecting 50 ml of air from the ink outlet 2. It was confirmed that the amount of oxygen and the amount of nitrogen dissolved in the ink composition of the ink container 4 were equal to or less than 1 ppm by using the gas chromatography method. An ink container 5 was prepared by leaving the ink container 4 for one week. It was confirmed that the amount of oxygen and the amount of nitrogen dissolved in the ink composition of the ink container 5 were equal to or more than 3 ppm by using the gas chromatography method.

The ink containers 1 to 5 were left for 48 hours under the condition of a temperature of 60° C., the ink compositions were taken out from the ink outlet 2, and changes in viscosity thereof before and after being left under heating were measured. The results are shown in Table 1.

Installation Direction C: the longitudinal axis of the storage container was parallel to the surface on which it was to be installed, and the film surface of the storage container was perpendicular to the installation surface.

In the container used in storage stability test 1, the distance from the air-liquid interface to the bottom portion of the container including the ink composition was in the range of 1 to 2 cm for the case of the installation direction A, about 6 cm for the case of the installation direction B, and about 4 cm for the case of the installation direction C.

Judgment Criteria

A: the change in viscosity was less than 5 (mPa·s) after heating for 48 hours under the condition of a temperature of 60° C., and generation of gel in the bottom portion of the container did not occurred.

B: the change in viscosity was equal to or more than 0.5 (mPa·s) after heating for 48 hours under the condition of a temperature of 60° C., or generation of gel in the bottom portion of the container did occur.

TABLE 1

| | Ink container (Ink composition 1) | De-airing process | Injection of air | Length of time after injecting air | Installation direction | Initial viscosity (mPa · s) | Viscosity after heating | Generation of gel | Judgment |
|---|---|---|---|---|---|---|---|---|---|
| Example 1 | Ink container 1 | No | Yes | — | A | 14.6 | 14.6 | — | A |
| Comparative Example 1 | Ink container 1 | No | Yes | — | B | 14.6 | 14.8 | Generated | B |
| Example 2 | Ink container 1 | No | Yes | — | C | 14.6 | 14.5 | — | A |
| Comparative Example 2 | Ink container 2 | No | No | — | A | 14.6 | 21.0 | Generated | B |
| Comparative Example 3 | Ink container 2 | No | No | — | B | 14.6 | 20.9 | Generated | B |
| Comparative Example 4 | Ink container 2 | No | No | — | C | 14.6 | 20.9 | Generated | B |
| Comparative Example 5 | Ink container 3 | Yes | No | — | A | 14.6 | 22.5 | Generated | B |
| Comparative Example 6 | Ink container 3 | Yes | No | — | B | 14.6 | 22.8 | Generated | B |
| Comparative Example 7 | Ink container 3 | Yes | No | — | C | 14.6 | 22.6 | Generated | B |
| Comparative Example 8 | Ink container 4 | Yes | Yes | — | A | 14.6 | 21.0 | Generated | B |
| Comparative Example 9 | Ink container 4 | Yes | Yes | — | B | 14.6 | 22.0 | Generated | B |
| Comparative Example 10 | Ink container 4 | Yes | Yes | — | C | 14.6 | 20.9 | Generated | B |
| Example 3 | Ink container 5 | Yes | Yes | One week | A | 14.6 | 14.8 | — | A |
| Comparative Example 11 | Ink container 5 | Yes | Yes | One week | B | 14.6 | 15.0 | Generated | B |
| Example 4 | Ink container 5 | Yes | Yes | One week | C | 14.6 | 14.9 | — | A |

In this case, the methods of installing the storage containers were as follows.

Installation Direction A: a longitudinal axis of the storage container was parallel to a surface on which it was be installed, and a film surface of the storage container was parallel to the installation surface.

Installation Direction B: the longitudinal axis of the storage container was perpendicular to the installation surface.

Storage Stability Test 2

The ink composition was introduced into the storage container shown in FIG. 4, and the heat-sealing process was performed to seal the storage container under the conditions shown in Table 2. In a case where 30 g of the ink composition and air were introduced into the storage container, ink containers 6 to 10 were processed as in the case of the storage stability test 1, except that the injected amount of air was 30 ml. The results are shown in Table 2.

TABLE 2

| | Ink container (Ink composition 1) | De-airing process | Injection of air | Length of time after injecting air | Installation direction | Initial viscosity (mPa · s) | Viscosity after heating | Generation of gel | Judgment |
|---|---|---|---|---|---|---|---|---|---|
| Example 5 | Ink container 6 | No | Yes | — | A | 14.6 | 14.6 | — | A |
| Example 6 | Ink container 6 | No | Yes | — | B | 14.6 | 14.5 | — | A |
| Example 7 | Ink container 6 | No | Yes | — | C | 14.6 | 14.5 | — | A |
| Comparative Example 12 | Ink container 7 | No | No | — | A | 14.6 | 21.0 | Generated | B |
| Comparative Example 13 | Ink container 7 | No | No | — | B | 14.6 | 20.9 | Generated | B |
| Comparative Example 14 | Ink container 7 | No | No | — | C | 14.6 | 20.9 | Generated | B |
| Comparative Example 15 | Ink container 8 | Yes | No | — | A | 14.6 | 22.5 | Generated | B |
| Comparative Example 16 | Ink container 8 | Yes | No | — | B | 14.6 | 22.8 | Generated | B |
| Comparative Example 17 | Ink container 8 | Yes | No | — | C | 14.6 | 22.6 | Generated | B |
| Comparative Example 18 | Ink container 9 | Yes | Yes | — | A | 14.6 | 21.0 | Generated | B |
| Comparative Example 19 | Ink container 9 | Yes | Yes | — | B | 14.6 | 22.0 | Generated | B |
| Comparative Example 20 | Ink container 9 | Yes | Yes | — | C | 14.6 | 20.9 | Generated | B |
| Example 8 | Ink container 10 | Yes | Yes | One week | A | 14.6 | 14.7 | — | A |
| Example 9 | Ink container 10 | Yes | Yes | One week | B | 14.6 | 14.9 | — | A |
| Example 10 | Ink container 10 | Yes | Yes | One week | C | 14.6 | 14.9 | — | A |

The capacity of the storage container in FIG. 4 was 75 ml. In a cross-sectional view shown in FIG. 4, the size of the container including the heat sealed portion was 94 mm×90 mm, and the size of the interior of container excluding the heat sealed portion was 80 mm×80 mm.

In the container used in the storage stability test 2, the distance from the air-liquid interface to the bottom portion of the container including the ink composition was about 4 cm for the case of the installation direction A, about 4 cm for the case of the installation direction B, and about 4 cm for the case of the installation direction C.

Preparation of Pigment Dispersion 1

N-Vinyl formamide (NVF, produced by Arakawa Chemical Industries, Ltd., beam set 770) was added to C.I. Pigment Black 7 (carbon black) of 15 parts as a colorant and Discur N-518 (produced by Dainichiseika Color & Chemicals Mfg. Co., Ltd.) of 3.5 parts as a dispersant, and the total amount of N-Vinyl formamide, C.I. Pigment Black 7 and Discur N-518 was 100 parts. These were mixed and stirred in order to make a mixture. A dispersion process was performed to the mixture with zirconium beads (the diameter was 1.5 mm) for 6 hours by using a sand mill (manufactured by Yasukawa Seisakusho). Subsequently, the zirconium beads were separated from the mixture by a separator and a pigment dispersion 1 was obtained.

Preparation of Pigment Dispersion 2

The pigment dispersion 2 was obtained by the same method as in the case of pigment dispersion 1, except that C.I. Pigment Yellow 155 was used as the colorant and Discur N-518 of 1.0 part was added.

Preparation of Pigment Dispersion 3

The pigment dispersion 3 was obtained by the same method as in the case of pigment dispersion 1, except that C.I. Pigment Violet 19 was used as the colorant and Discur N-518 of 1.0 part was added.

Preparation of Pigment Dispersion 4

The pigment dispersion 4 was obtained by the same method as in the case of pigment dispersion 1, except that C.I. Pigment Blue 15:3 was used as the colorant and Discur N-518 of 2.0 parts were added.

By using the pigment dispersions 1 to 4 prepared as described above, light-curable ink compositions 6 to 9 were prepared as in the composition below. That is, N-Vinyl formamide (NVF, produced by Arakawa Chemical Industries, Ltd., beam set 770), tripropylene glycol diacrylate (TPGDA, produced by SHIN-NAKAMURA CHEMICAL CO., LTD, APG-200), trimethylolpropane EO adduct triacrylate (produced by Osaka Organic Chemical Industry LTD., biscoat #360) and allyl glycol (produced by NIPPON NYUKAZAI CO., LTD., AG) were used as the monomers. In addition, Irgacure 819 and 369 and Darocur EHA (produced by Ciba Specialty Chemicals K.K.) as the photoelectric conversion-polymerization initiators or the polymerization promoters, and BYK-UV 3570 (produced by BYK Chemical Japan) as the surfactant were used as additives. Theses were mixed and dissolved completely so that an ink solvent was prepared. Subsequently, the pigment dispersions 1 to 4 were stirred and added drop-wise to the ink solvent. After the adding of the pigment dispersions 1 to 4 was completed, the pigment dispersions 1 to 4 and the ink solvent were mixed and stirred for one hour at room temperature, and filtered by using a 5 μm membrane filter, thus preparing light-curable ink compositions 2 to 5 of the composition below.

Pigment Dispersion: 20% by weight
NVF: 7% by weight
Biscoat #360: 15% by weight
Irgacure 819: 4% by weight
Irgacure 369: 1% by weight
Darocur EDB: 1% by weight
BYK-UV 3570: 0.2% by weight
AG: remained amount Storage Stability Test 3

The ink compositions 2 to 5 were introduced into the storage containers of FIG. 4, and the heat sealing process was performed to seal the storage containers under the conditions where the ink compositions, the installation direction, existence or nonexistence of the de-airing process and the injection of air and the like were different one another as shown in FIG. 3. In a case where 30 g of the ink composition and the air were introduced into the storage container, the storage containers were processed as in the case of the storage stability test 1, except that the injected amount of air was 30 ml and a heating test was performed for 120 hours under the condition of the temperature of 60° C. The results are shown in Table 2.

The distance from the air-liquid interface to the bottom portion of the container including the ink composition was the same as in the case of storage stability test 2.

In addition, in the example, the injected amount of air was 30 ml or 50 ml. However, in the embodiment of the invention, since the amount of oxygen, serving as the polymerization inhibitor, equal to or more than a predetermined amount is dissolved in the ink composition, the air is injected (introduced) into an extend in which it is possible to dissolve the amount of oxygen equal to or more than the predetermined amount in the ink composition. The amount of air is not limited to 30 ml or 50 ml.

TABLE 3

| | Kind of ink composition | De-airing process | Injection of air | Length of time after injecting air | Installation direction | Initial viscosity (mPa · s) | Viscosity after heating | Generation of gel | Judgment |
|---|---|---|---|---|---|---|---|---|---|
| Example 11 | Ink composition 2 | No | Yes | — | B | 6.5 | 6.6 | — | A |
| Example 12 | Ink composition 3 | No | Yes | — | B | 7.6 | 7.8 | — | A |
| Example 13 | Ink composition 4 | No | Yes | — | B | 6.5 | 6.6 | — | A |
| Example 14 | Ink composition 5 | No | Yes | — | B | 6.5 | 6.5 | — | A |
| Example 15 | Ink composition 2 | No | Yes | — | A | 6.5 | 6.5 | — | A |
| Example 16 | Ink composition 2 | No | Yes | — | C | 6.5 | 6.5 | — | A |
| Comparative Example 21 | Ink composition 2 | No | No | — | B | 6.5 | — | Generated | B |
| Comparative Example 22 | Ink composition 2 | Yes | No | — | B | 6.5 | — | Generated | B |
| Comparative Example 23 | Ink composition 2 | Yes | Yes | — | B | 6.5 | — | Generated | B |
| Example 17 | Ink composition 2 | Yes | Yes | One week | B | 6.5 | 6.5 | — | A |

It is clear that the gel was easily generated when the amount of dissolved oxygen and the amount of dissolved nitrogen were less than 3 ppm from comparative examples 5 to 7 of Table 1, comparative examples 15 to 17 of Table 2 and comparative example 22 of Table 3.

It is clear that the gel was easily generated when performing the de-airing process and the gel was rarely generated when injecting the air from Tables 1 to 3. Moreover, it is clear that the gel was rarely generated when the distance from the air-liquid interface to the bottom portion of the container including the ink composition was equal to less than 5 cm.

As described above, it can be seen that dark polymerization is effectively prevented even when the light-curable ink composition is stored for a long period of time and quality deterioration is also prevented by filling the light-curable ink composition and the air into the container, maintaining the amount of oxygen dissolved in the light-curable ink composition to be equal to or more than 3 ppm and maintaining the distance from the air-liquid interface to the bottom portion of the container to be equal to or less than a predetermined value.

In the examples, the distance from the air-liquid interface to the bottom portion of the container was in the range of 1 to 2 cm or 4 cm. However, it was possible to prevent the quality deterioration even when the distance was 5 cm. That is, it is possible to prevent the quality deterioration as long as the distance from the air-liquid interface to the bottom portion of the container is equal to or less than 5 cm.

In the examples, both of the amount of oxygen and the amount of nitrogen dissolved in the ink composition were equal to or more than 3 ppm. However, the oxygen serves as a polymerization inhibitor. Accordingly, the amount of oxygen dissolved in the ink composition needs to be at least 3 ppm, and there is no need that the amount of nitrogen dissolved in the ink composition is equal to or more than 3 ppm in the embodiment of the invention. The upper limit of the amount of oxygen and the amount of nitrogen dissolved in the ink composition is different in accordance with the types of ink composition, temperature, pressure or the like. However, the upper limit is generally in the range of 5 to 6 ppm under the conditions of room temperature and normal pressure.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

The entire disclosure of Japanese Patent Application Nos: 2006-77771, filed Mar. 20, 2006 and 2007-28336, filed Feb. 7, 2007 are expressly incorporated by reference herein.

What is claimed is:

1. A method of storing a light-curable ink composition, wherein air and the light-curable ink composition are introduced into a container, and wherein the distance from an air-liquid interface to a bottom portion of the container is equal to or less than 5 cm such that the amount of oxygen dissolved in the light-curable ink composition is maintained so as to be equal to or more than 3 ppm prior to mounting on a printing apparatus.

2. The method of storing a light-curable ink composition according to claim 1, wherein the amount of nitrogen dissolved in the light-curable ink composition is maintained to be equal to or more than 3 ppm.

3. The method of storing a light-curable ink composition according to claim 1, wherein the distance from the air-liquid interface to the bottom portion of the container is equal to or less than 4 cm.

4. The method of storing a light-curable ink composition according to claim 1, wherein the distance from the air-liquid interface to the bottom portion of the container is in the range of 1 to 4 cm.

5. The method of storing a light-curable ink composition according to claim 1, wherein the amount of air introduced into the container is equal to or more than 30 ml.

6. The method of storing a light-curable ink composition according to claim 1, wherein the amount of air introduced into the container is in the range of 30 to 50 ml.

7. The method of storing a light-curable ink composition according to claim 1, wherein the container is an airtight container.

8. The method of storing a light-curable ink composition according to claim 7, wherein the container is a pouch-like container comprising at least one bonded film layer.

9. The method of storing a light-curable ink composition according to claim 1, wherein the amount of oxygen dissolved in the light-curable ink composition is constantly maintained so as to be equal to or more than 3 ppm.

10. An ink container into which air and a light-curable ink composition are introduced, wherein the distance from an air-liquid interface to a bottom portion of the storage container is equal to or less than 5 cm such that the light-curable ink composition is stored in a state where the amount of oxygen dissolved in the light-curable ink composition is maintained so as to be equal to or more than 3 ppm prior to mounting on a printing apparatus.

11. The ink container according to claim 10, wherein the light-curable ink composition is stored in a state where the amount of nitrogen dissolved in the light-curable ink composition is maintained so as to be equal to or more than 3 ppm.

12. The ink container according to claim 10, wherein the light-curable ink composition is stored in a state where the distance from the air-liquid interface to the bottom portion of the storage container is maintained so as to be equal to or less than 4 cm.

13. The ink container according to claim 10, wherein the light-curable ink composition is stored in a state where the distance from the air-liquid interface to the bottom portion of the storage container is in the range of 1 to 4 cm.

14. The ink container according to claim 10, wherein the amount of air introduced into the storage container is equal to or more than 30 ml.

15. The ink container according to claim 10, wherein the amount of air introduced into the storage container is in the range of 30 to 50 ml.

16. The ink container according to claim 10, wherein the storage container is an airtight container.

17. The ink container according to claim 16, wherein the storage container is a pouch-like container comprising at least one bonded film layer.

18. The ink container according to claim 10, wherein the amount of oxygen dissolved in the light-curable ink composition is constantly maintained so as to be equal to or more than 3 ppm.

* * * * *